Nov. 30, 1965 F. M. WOOD 3,220,248
ULTRASONIC INSPECTION DEVICE
Filed Aug. 20, 1962 3 Sheets-Sheet 1
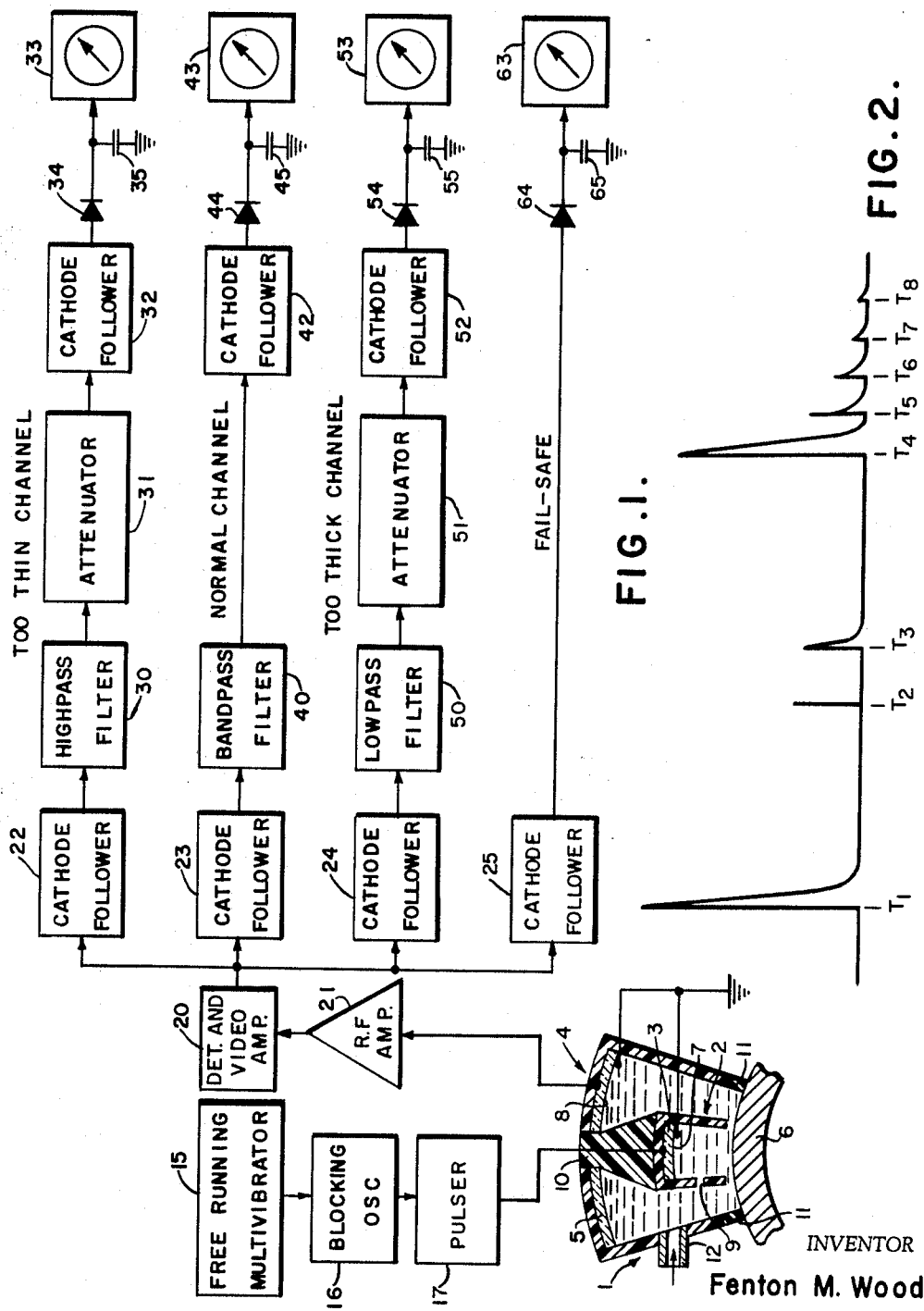
INVENTOR
Fenton M. Wood
BY
Arnold & Roylance
ATTORNEY

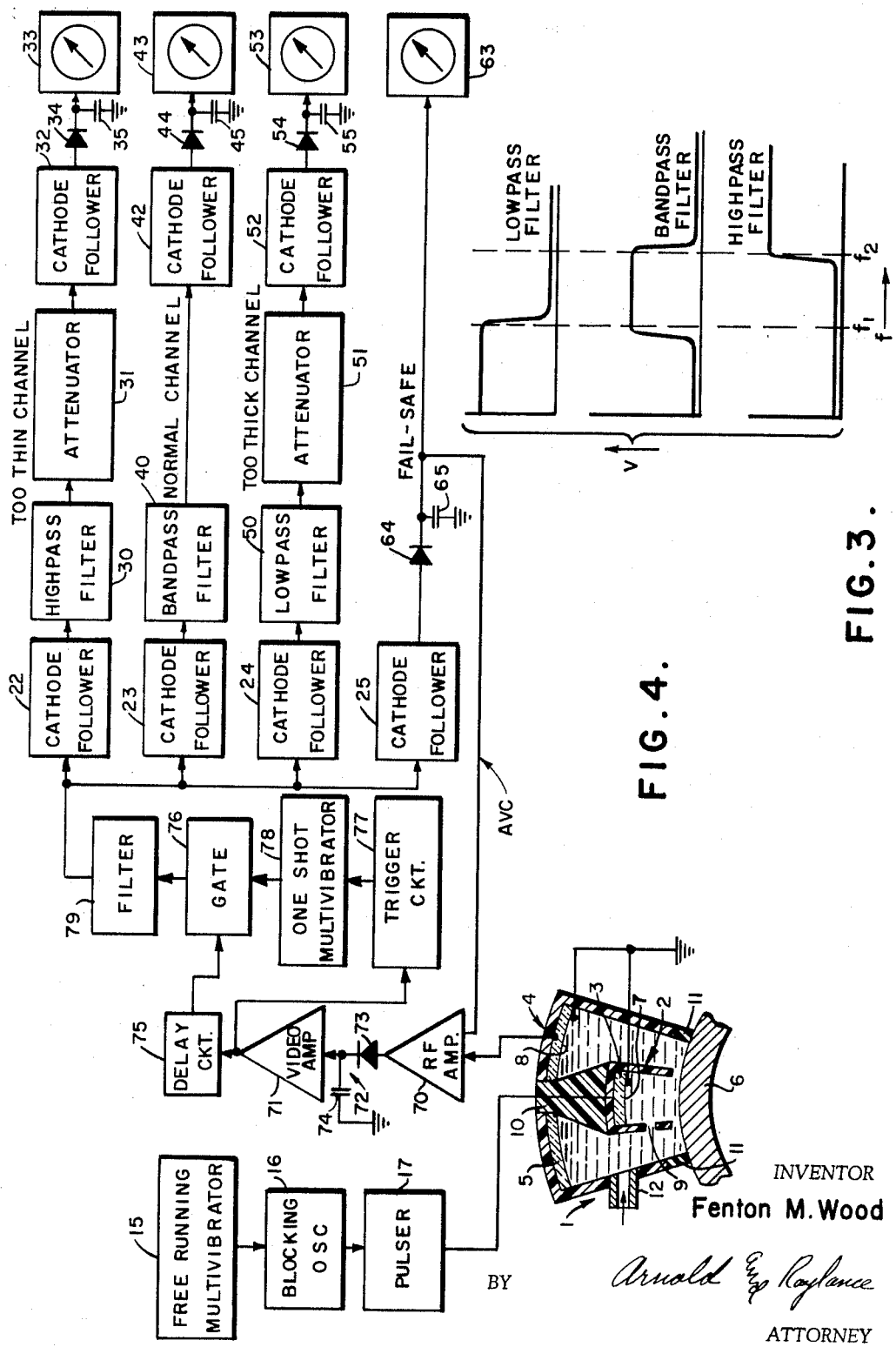

Nov. 30, 1965   F. M. WOOD   3,220,248
ULTRASONIC INSPECTION DEVICE
Filed Aug. 20, 1962   3 Sheets-Sheet 3
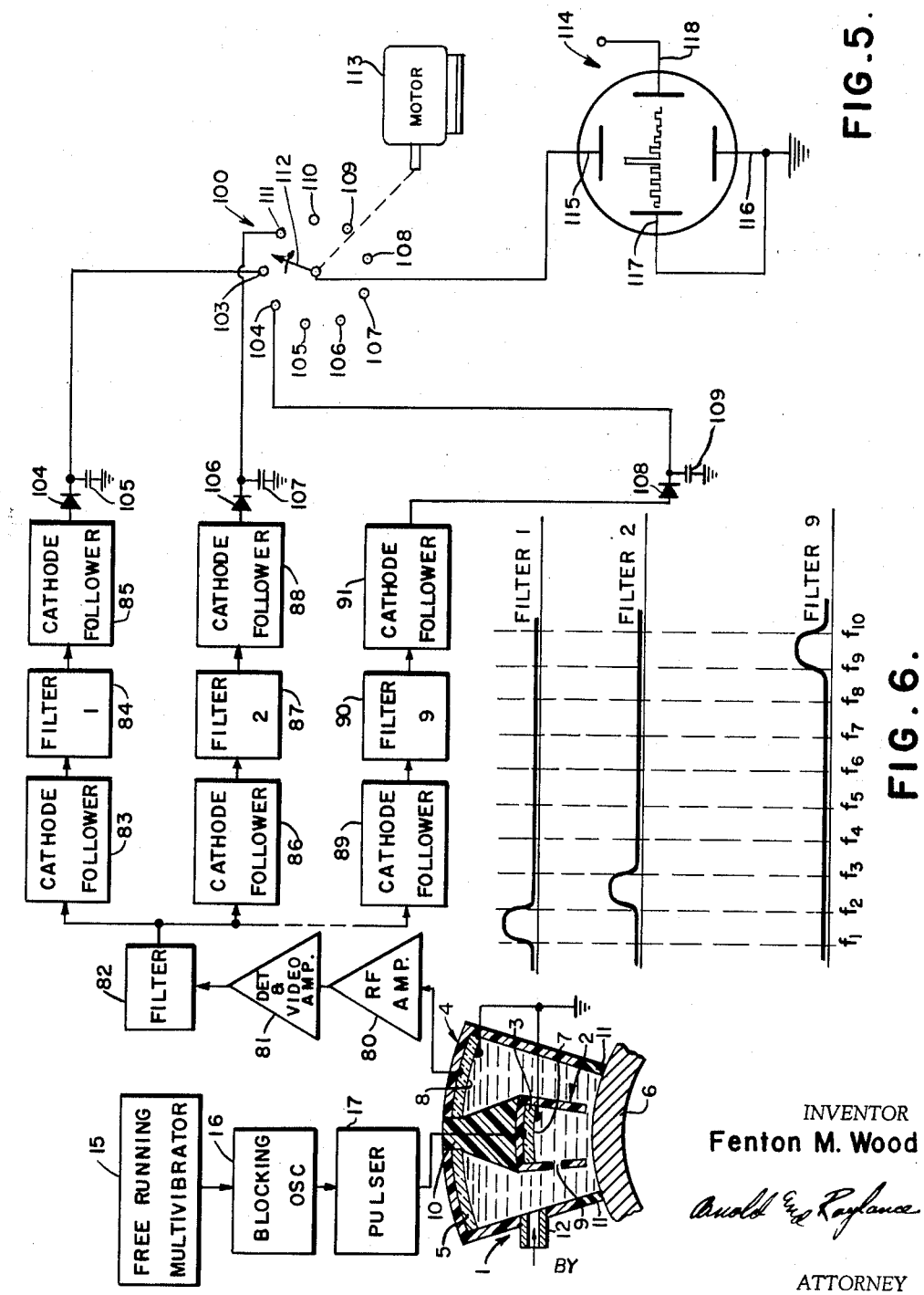
INVENTOR
Fenton M. Wood
BY
ATTORNEY

United States Patent Office

3,220,248
Patented Nov. 30, 1965

3,220,248
ULTRASONIC INSPECTION DEVICE
Fenton M. Wood, Sugarland, Tex., assignor, by mesne assignments, to American Machine & Foundry Company, New York, N.Y., a corporation of New Jersey
Filed Aug. 20, 1962, Ser. No. 217,800
1 Claim. (Cl. 73—67.7)

This invention relates to ultrasonic apparatus, and more particularly to such apparatus for making thickness measurements.

There are many instances where the distance between two surfaces must be measured when only one of the surfaces is accessible, such as, for example, when measuring the wall thickness of a long tubular member. The ultrasonic pulse echo ranging systems, which operate on the same principle as most radar and sonar systems, appear to be the most suitable of the presently available systems. In these systems, a pulse of ultra sonic energy is generated which travels through the member from the accessible surface, reflects off the non-accessible surface and returns through the member to the accessible surface where the pulse is detected. The round trip travel time for the pulse is directly proportional to distance travel, or in other words, directly proportional to the distance between the surfaces. Thus, the distance between surfaces can be measured by measuring the time interval between the instant at which the pulse was transmitted and the instant at which the echo is subsequently detected.

In most echo ranging systems, the ultrasonic energy pulses are produced and detected by piezoelectric crystal transducers which convert high frequency electrical energy into acoustical ultrasonic energy and vice versa. These transducers are usually positioned against the member being measured in order to obtain proper acoustic coupling and an accurate measurement of thickness. Such apparatus, however, is satisfactory only where stationary spot measurements are made. Where continuous running measurements are desirable, non-uniform coupling and substantial wear of the transducer crystals result.

The problems of transducer wear and non-uniform coupling can be eliminated by using a liquid coupling medium interposed between the transducer and the member being measured. However, the disadvantage of using liquid coupling mediums is that the electronic circuits required to obtain accurate indications are considerably more complex. The time required for the pulse to pass through the coupling medium is included with the time measured between the transmitted pulse and the subsequently detected echo pulse, and, therefore, the electronic time measuring circuits must be capable of compensating for this additional time factor. Thus, apparatus of this type, as presently available, is expensive and difficult to adjust and is, therefore, only useful in relatively long, continuous measurements.

It is a general object of this invention to eliminate the problems with the past systems, and more specifically, to eliminate non-uniform coupling and transducer wear problems without requiring electronic compensating circuits.

It is another object of this invention to provide thickness measuring apparatus having a liquid coupling medium interposed between the transducers and the member being measured, and which is not effected by the time delay caused by the ultrasonic pulses passing through the coupling medium.

It is a further object of this invention to provide a pulse echo ranging thickness measuring device which does not measure the time lapse between the transmitted pulse and the first echo pulse, but instead is responsive to the time lapse between successive echo pulses.

Once a pulse of ultrasonic energy is induced in the member being measured, the pulse continues to travel back and forth between the opposite sides of the member until the enrgy is dissipated. Each time the ultrasonic energy pulse is reflected off one of the walls, a portion of the pulse energy passes through the wall. This portion of the energy passes through the coupling medium and, shortly thereafter, is detected by a receiving transducer which in turn develops a corresponding electrical output pulse. It should be noted that the time interval between the transmitted electrical pulse and the first electrical echo pulse is greatly affected by the time delay caused by the pulses travelling through the coupling medium. However, each of the echo pulses are delayed equally when passing through the coupling medium and, therefore, the time interval between successive echo pulses is not altered.

By definition, the fundamental frequency of a group of echo pulses is equal to the reciprocal of the time interval between successive echo pulses. The time between successive echo pulses is a function of the thickness being measured. Thus, rather simple apparatus responsive to the fundamental frequency of a group of successive echo pulses can be used to obtain a measure of member thickness without compensating for the time delay caused by the coupling medium.

The apparatus, in accordance with the foregoing and other objects, is illustrated and described in greater detail in the following specification and drawings, the drawings forming a portion of the specification and wherein FIG. 1 is a schematic diagram of the apparatus in accordance with one embodiment;

FIG. 2 is a diagram illustrating the time relationship of the transmitted pulse and subesquent echo pulses;

FIG. 3 is a diagram illustrating the frequency characteristic of filters utilized in the embodiment of FIG. 1;

FIG. 4 is a schematic diagram of apparatus in accordance with another embodiment;

FIG. 5 is a schematic diagram of the apparatus in accordance with still another embodiment; and FIG. 6 is a diagram illustrating the frequency characteristic of filter circuits utilized in the FIG. 5 embodiment.

Referring to FIG. 1, the apparatus is illustrated including a transducer housing 1, having an inner transmitter shielding structure 2 which supports a transmitting transducer 3, and an outer liquid enclosing casing 4 which supports a receiving transducer 5. The housing maintains the transducers at appropriate positions with respect to the outer cylindrical surface of a tubular member 6, the wall thickness of which is being measured.

The transducers are constructed from a suitable piezoelectric material such as quartz. The transmitting surface 7 of the transmitting transducer, and the surface opposite the transmitting surface, are each coated with a metallic electric conducting film. Thus, when a potential is applied between the coated surfaces of the transmitting transducer, current flows through the transducer causing a corresponding change in transducer dimensions in accordance with the reverse piezoelectric effect. The receiving surface 8 of the receiving transducer, and the surface opposite are similarly coated. When the receiving transducer is vibrated by received ultrasonic energy, the receiving transducer provides a corresponding electrical output signal in accordance with the piezoelectric effect. The transmitting and receiving surfaces of the respective transducers are preferably shaped to conform with the adjacent surface of the member being measured. Accordingly, since the apparatus is illustrated as adapted to measure the wall thickness of a tubular member, the transmitting and receiving surfaces are curved so as to become concentric with the outer surface of the tubular member when the transducer housing is appropriately positioned.

The transmitting transducer is mounted on a suitably curved wall of transmitting shielding structure 2 which is a five-sided structure, preferably molded of Bakelite or other similar non-ultrasonic energy transmitting material. The shielding structure has four side walls integrally connected to the edges of the curved wall. Two of these side walls are spaced apart and parallel, the other two side walls being spaced apart and slanted to extend radially outwardly from member 6 when the housing is positioned. The transmitting transducer is securely cemented to the curved wall and portions of the side walls so as to obtain a highly damped transducer mounting. With such a transducer mounting, the transducer vibrates only in response to electrical energization, and does not continue to vibrate after energization ceases. One of the side walls is provided with a suitable aperture 9 which permits liquid to flow into the enclosure of the shielding structure.

The resonance effect in the coupling medium column, between the transmitting transducer 3 and the outside surface of pipe 6, can be minimized by conventional techniques. For example, the size of the transmitting transducer 3 can be reduced to expose a highly absorptive backing material, such as structure 10. Also, an attenuating or impedance matching screen or block between the transmitting transducer 3 and the pipe 6 is convenient for minimizing the column resonance.

The receiving transducer is mounted on a suitably curved wall of outer casing 4 which is constructed of bakelite or similar material. The outer casing has a configuration generally similar to that previously described for the shielding structure. The dimensions of the outer casing are somewhat greater than those of the shielding structure, and, therefore, receiving transducer 5 is correspondingly larger and spaced at a greater distance from tubular member 6. Receiving transducer 5 has an aperture located approximately in the center of the transducer and of dimensions sufficient to accommodate an energy absorbing support structure 10. The support structure is securely fastened between the curved surfaces of outer casing 4 and shielding structure 2, and is preferably constructed of a plastic material which absorbs ultrasonic energy and, insofar as possible, prevents the ultrasonic energy generated by the transmitting transducer from effecting the receiving transducer.

The lower surfaces (as viewed) of the outer casing side walls generally conform to the external surface of tubular member 6. A rubber sealing strip 11 is secured to these surfaces adjacent the outer surface of the tubular member. An inlet 12 is provided in one of the side walls of the outer casing. The volume bounded by the outer casing and the external surface of tubular member 6, which includes the volume bounded by the shielding structure, is filled with a suitable acoustic coupling medium such as water mixed with a wetting agent which prevents air bubbles from forming. It is anticipated that some liquid will escape between sealing strips 11 and member 6, and, therefore, replacement liquid is continuously provided via inlet 12 to insure that the enclosure is completely filled at all times.

The circuits for energizing the transmitting transducer include a free-running multivibrator circuit 15 which is connected to drive a blocking oscillator circuit 16 which in turn is connected to actuate a pulser circuit 17. The output of the pulser circuit is connected to one of the coated surfaces of transmitting transducer 3, the other coated surface being connected to ground. When the pulser circuit is momentarily actuated, it provides high frequency electrical energy, preferably in the megacycle range, which causes transmitting surface 7 to vibrate at a corresponding high frequency creating ultrasonic energy in the form of compression waves which are propagated toward tubular member 6 via the coupling medium. The propagated energy has a curved wave front conforming to the curvature of the outer surface of tubular member 6 and travels in a direction everywhere perpendicular to the outer surface. The ultrasonic energy enters the tubular member and is shorty thereafter reflected off an inner surface back toward the outer surface where it is again reflected toward the inner surface. The ultrasonic energy continues to bounce back and forth between the inner and outer surfaces until the energy is completely dissipated. Each time the energy is reflected off the outer surface, a portion of the energy passes through the outer surface and is subsequently detected by the receiving transducer 5 which generates a corresponding electrical echo pulse. It should be noted that the curved receiving surface 8 of transducer 5 renders the transducer relatively insensitive to stray reflected energy.

The time relationship between the various pulses is illustrated in FIG. 2. At a time $T_1$ pulser 17 is momentarily energized providing a high energy ultrasonic pulse. A portion of this pulse energy passes through the absorbing support structure 10 and reaches the receiving transducer at a time $T_3$ causing the first output pulse. At a time $T_2$ the pulse of ultrasonic energy reaches the outer surface of tubular member 6 after passing through the coupling medium. A portion of the pulse energy is reflected off the outer surface and returns through the coupling medium to the receiving transducer causing the first echo pulse at time $T_4$. The time interval between times $T_1$ and $T_4$ is therefore the travel time for the pulse energy to go from the transmitting transducer to the receiving transducer through the coupling medium without passing through the tubular member wall. The portion of the energy not reflected off the outer surface enters the wall of tubular member 6 and is reflected off the inner surface, a portion of this reflected energy returning through the wall and the coupling medium causing an echo pulse at time $T_5$. The interval between times $T_4$ and $T_5$ is equal to the round-trip travel time through the wall of tubular member 6. The additional echo pulses occur at times $T_6$, $T_7$ and $T_8$ such that the time interval between successive pulses is equal to the round-trip travel time through the tubular member wall. The time interval between the echo pulses is a function only of the wall thickness and is not effected by the travel distance through the coupling medium since each of the echo pulses has been delayed to the same extent corresponding to the travel time through the coupling medium. It should be noted that the pulse energy which causes the pulse at time $T_4$ does not pass through the wall of tubular member 6, and, therefore, the pulse has a magnitude substantially larger than that of the other echo pulses.

The pulser circuit energizes the transmitting transducer for a time duration equal to the length of the output pulses from blocking oscillator 16. The length of these pulses must be substantially less than the anticipated spacing between successive echo pulses. The time interval between output pulses from the blocking oscillator is determined by the oscillating frequency of free-running multivibrator circuit 15. This oscillating frequency is so selected that the time interval between successive ultrasonic energy pulses provided by the transmitting transducer is greater than the time interval between times $T_1$ and $T_8$ to prevent interference between successive ultrasonic pulses.

One of the coated surfaces of receiving transducer 5 is connected to a detector and video amplifier 20 via a wide band radio frequency amplifier 21, the other coated surface of the transducer being connected to ground. Detector and video amplifier 20 is constructed to demodulate the signals having a frequency corresponding to the resonant frequency at the receiving transducer and produce a video output signal having pulses corresponding to the ultrasonic pulses striking receiving transducer 5. The output of detector and video amplifier 20 is connected to the input of four, conventional cathode follower circuits 22–25.

The output circuits which provide a visual indication of pipe wall thickness are divided into three separate channels which for convenience are referred to as the "too thin channel," the "normal channel" and the "too thick channel." The "too thin channel" includes cathode follower circuit 22 which is connected to a high pass filter 30. The output of the filter circuit is connected to a conventional cathode follower circuit 32 through an attenuator circuit 31. The output from cathode follower 32 is connected to a voltage responsive meter 33 via a rectifying diode 34. A capacitor 35 is connected between the meter input and ground to by-pass the alternating current components of the rectified signal. The "too thick channel" includes cathode follower 24 which is similarly connected to a direct current voltage responsive meter 53 via a low pass filter 50, and attenuator 51, a cathode follower circuit 52, a rectifying diode 54, and a filtering capacitor 55. The "normal channel" is similar to the other channels except that the attenuator circuit is omitted. Accordingly, cathode follower circuit 23 is connected to a band pass filter 40 which in turn is connected to a cathode follower circuit 42. The output from cathode follower circuit 42 is rectified by a diode 44 which is connected to a direct current voltage responsive meter 43. A capacitor 45 is connected between the input of meter 43 and ground to filter the alternating current components of the rectified signal.

Referring again to FIG. 2, it should be noted that the time interval between successive echo pulses, is equal to the round-trip travel time required for the ultrasonic energy between the inner and outer surfaces of tubular member 6, and, therefore, this time interval is directly proportional to the thickness, i.e., the distance between the inner and outer surfaces. The time spacing between each of the successive echo pulses is identical. The fundamental frequency of periodically recurring pulses is equal to the reciprocal of the time interval between an adjacent pair of pulses. This fundamental frequency is proportional to the wall thickness.

The frequency versus attenuation characteristics of filters 30, 40 and 50 are illustrated in FIG. 3. Band pass filter 40 attenuates all frequencies below the frequency $f_1$, and all frequencies above the value $f_2$. This band pass filter is so constructed that the frequencies between $f_1$ and $f_2$ include the fundamental frequencies corresponding to an acceptable range of wall thicknesses. Low pass filter 50 attenuates all frequencies above the frequency $f_1$, and, therefore, passes the frequencies corresponding to wall thicknesses greater than those in the accepted range. High pass filter 30 is constructed to attenuate all frequencies below the value $f_2$, and, therefore, this filter passes the higher frequencies corresponding to wall thicknesses which are less than those in the accepted range.

If meter 43, in the "normal channel," provides the largest output indication then it is known that the wall thickness is within the acceptable range. If meter 33 provides the largest output indication, then it is known that the wall thickness is "too thin," and similarly if meter 53 provides the largest output indication it is known that wall thickness is "too great."

Cathode follower circuit 25 is part of a fail-safe circuit. Cathode follower circuit 25 is connected to a direct current voltage responsive meter 63 via a diode 64. A capacitor 65 is connected between the meter input and ground to filter the alternating components of the rectified signal. Since there is no filter circuit connected between the meter 63 and cathode follower 25, meter 63 should always provide an output indication when the circuit is in operation. The absence of an indication on meter 63 indicates that the apparatus is not functioning properly, and, in this manner, provides a "fail-safe" indication.

Another embodiment of the invention is illustrated in FIG. 4. Many of the components are similar to those previously described in FIG. 1, and, therefore, similar reference numerals are employed.

Referring to FIG. 2, it should be noted that the first echo pulse at time $T_4$ is substantially greater than the subsequent echo pulses at times $T_5$–$T_8$. Frequency responsive circuits can best respond to the fundamental frequency of a series of pulses, if these pulses are approximately of the same magnitude. Therefore, if the large pulse at time $T_4$, and any previous meaningless pulses are eliminated, the frequency responsive circuits will more accurately respond to the fundamental frequency of the echo.

One of the coated surfaces of receiving transducer 5 is connected to the input of a conventional RF amplifier 70, the other coated surface being connected to ground. The output of the RF amplifier is connected to the input of a conventional video amplifier 71 via a detector circuit 72. The detector circuit includes a diode 73 connected between the amplifiers, and a capacitor 74 connected between the input to video amplifier 71 and ground. The output of the video amplifier is connected to one input of an electronic gate circuit 76 via a fixed, non-frequency discriminating time delay circuit 75. The output of the video amplifier is also connected to the input of a voltage responsive trigger circut 77 which is of a conventional type generally known as a Schmitt trigger. The output of the trigger circuit is connected to the input of a one-shot multivibrator circuit which provides an output pulse which is connected to open the electronic gate 76. The output of the gate circuit is connected to the input of filter circuit 79, which filters out the very high frequencies caused by crystal ringing (as opposed to frequencies resutling from ringing of the measured member) and the low frequencies resulting from structural instabilities.

Gate circuit 76 is normally closed and does not permit applied pulses from delay circuit 75 to pass through to filter circuit 79. When the first echo pulse occurs (at time $T_4$ in FIG. 2), the pulse is amplified by amplifiers 70 and 71 and then applied to the input to trigger circuit 77. The trigger circuit provides an output pulse only when the applied input potential exceeds a certain threshold value. The trigger circuit is so constructed that the threshold value is greater than the peak magnitude of echo pulses at times $T_5$–$T_8$ (FIG. 2), but less than the peak value of the first echo pulse at time $T_4$. Accordingly, occurrence of the first echo causes trigger circuit 77 to provide a pulse which is applied to one-shot circuit 78. The one-shot circuit is so constructed that the corresponding output pulse, as applied to gate circuit 76, is somewhat longer than the time interval between the echo pulses at $T_5$–$T_8$ (FIG. 2). Thus, gate circuit 76 is opened in response to the large echo pulse at time $T_4$ to permit the subsequent echo pulses at times $T_5$–$T_8$ to pass through to filter circuit 79. The time delay provided by circuit 75 is sufficient to permit the trigger circuit and the one-shot multivibrator circuit to operate the gate circuit prior to the echo pulse at time $T_5$ reaching the input of gate circuit 76.

The signal applied to meter 63 has a magnitude proportional to the magnitude of pulses passing through filter circuit 79. The signal applied to meter 63 is also applied to the gain control input of RF amplifier 70. This automatic gain control circuit is so connected that the magnitude of the pulses passing through filter circuit 79 is maintained at a fairly constant level.

The remaining portions of the circuit illustrated in FIG. 4 are essentially the same and operate in essentially the same manner as previously described in FIG. 1.

The apparatus described in FIGS. 1 and 4 is of the go, no-go type or, in other words, of the type which indicates whether or not the thickness measured is within the accepted range or not. In some installations, it is desirable to have a more definite indication of a larger variety of wall thicknesses. The apparatus illustrated schematically in FIG. 5 is of this type.

The circuits for energizing the transmitting transducer, as well as the transducers and the transducer housing, are essentially the same as those previously described in FIG. 1 and, therefore, similar reference numerals are utilized.

One of the coated surfaces of receiving transducer 5 is connected to the input of a RF amplifier 80, the other coated surface being connected to ground. The RF amplifier is of conventional design and is capable of amplifying the high frequency echo pulse signals which contain megacycle frequency components. The output of the RF amplifier is connected to the input of a combined detector and video amplifier circuit 81. The detector portion of the circuit removes the high frequency components and the video amplifier portion amplifies the resulting echo pulses. The output of circuit 81 is connected to the input of nine separate cathode follower circuits via a filter circuit 82. The filter circuit is constructed to reject frequency components corresponding to the resonant frequency of receiving transducer 5.

The freqeuncy detection portion of the apparatus includes nine separate channels, only three of which are specifically illustrated in FIG. 5. The first channel includes a narrow band pass filter 84 connected between two conventional cathode follower circuit 83 and 85, cathode follower circuit 83 being connected to filter 82. Similarly, the second channel includes a narrow band pass filter 87 connected between cathode follower circuits 86 and 88, and the ninth channel includes a narrow band pass filter 90 connected between cathode follower circuits 89 and 91, cathode follower circuits 86 and 89 being connected to filter circuit 82. The remaining channels similarly include a band pass filter and associated cathode followers.

The frequency characteristics of the narrow band pass filters in the nine channels are illustrated in FIG. 6. It is assumed that the range of wall thicknesses to be measured is known, and that range of corresponding fundamental frequencies are between the values $f_1$ and $f_{10}$. This range of frequencies is divided into nine equal segments and the nine band pass filters in respective channels are each constructed to pass frequencies of a different one of these segments. Thus, if the wall thickness corresponds to the maximum thickness which is measured by the apparatus, the fundamental frequency of the echo pulses is $f_1$. A signal of this frequency passes through filter circuit 84 in channel 1 and, therefore, cathode follower 85 provides an output potential. If the wall thickness is somewhat less, the fundamental frequency increases and can pass through filter circuit 87 in the second channel causing circuit 88 to provide an output potential.

As the wall thickness decreases further, different ones of the channels 3–8 provide the output potential. When the wall thickness is of the minimum thickness which can be measured by the apparatus, the corresponding fundamental frequency will be $f_{10}$ which can pass through filter 90 in the ninth channel causing cathode follower 91 to provide an output potential.

The outputs from the nine separate channels are each connected to a different one of fixed contact 103–111 of a rotary switch 100. The switch 100 has a wiper arm 112, driven by a motor 113, that successively contacts each of fixed contacts 103 to 111 and selectively couples the outputs from the nine separate channels to a suitable indicating device.

The indicating device can take several forms, the function being to display the output signal from the nine channels with respect to time. A continuous presentation is provided by utilizing a conventional oscilloscope comprising cathode ray tube 114 having vertical deflection plates 115 and 116 and horizontal deflection plates 117 and 118. Horizontal deflection plate 117 and vertical deflection plate 116 are grounded and the switch wiper arm 112 is connected directly to the vertical deflection plate 115. When an appropriate horizontal sweep voltage is applied to the horizontal deflection plate 118, synchronized to sweep the beam of cathode ray tube 114 across the screen for each complete cycle of rotation of switch wiper arm 112, the output signals are presented in a continuous manner. The synchronization of the switch 100 and the horizontal sweep is conventional and can be accomplished in many ways. For example, a trigger signal from the switch 100, obtained by using an additional contact can control the horizontal sweep generator. Under normal circumstances the signal presentation consists of a curve that has a vertical deflection following successive channel signal levels, the particular thickness of the pipe 6 being identified by the position along the horizontal cathode ray tube face dimension for the maximum deflection. The horizontal face dimension of the cathode ray tube can be calibrated in units of thickness to directly read the pipe thickness.

While it has been mentioned that filters 30, 40, 50, 84, 87, and 90 pass the associated fundamental frequency of the received echo signal depending on the thickness of the measured member, it is obvious that the filters could be tuned to pass integral harmonics of the respective frequencies. This might be desirable to cause band separation between the detected frequency of the received signal corresponding to an acceptable thickness and the detected frequency of a signal corresponding to a nonacceptable thickness. In fact, circuits that are responsive to more than single integral multiples could be employed through the use of appropriate logic circuits.

While several illustrative embodiments of the invention have been illustrated, it should be realized by those skilled in the art that numerous other embodiments are conceivable. The frequency responsive output circuits illustrated are merely of two relatively simple types, but it is to be understood that virtually any type of circuit capable of discrimination between signals of different frequencies could be utilized. The scope of this invention is more particularly defined in the appended claim.

What is claimed is:

In ultrasonic measuring apparatus, the combination transmitting transducer means for inducing propagating ultrasonic pulse energy in a member being measured;

receiving transducer means acoustically coupled to the member and responsive to pulse energy reflected off surfaces of the member to provide corresponding electrical pulses;

first circuit means connected to said receiving transducer means for passing only signals which are on the same order of magnitude by rejecting pulses corresponding to reflected pulse energy which has not passed through the member; and second circuit means connected to said first circuit means responsive to an integral multiple of the fundamental frequency of non-rejected electrical pulses for producing an output.

References Cited by the Examiner

UNITED STATES PATENTS

| | | | |
|---|---|---|---|
| 2,672,392 | 3/1954 | Caples et al. | 73—67.8 X |
| 2,883,860 | 4/1959 | Henry | 73—67.9 |
| 2,888,824 | 6/1959 | Henry | 73—67.9 |
| 2,921,465 | 1/1960 | Cook | 73—67.7 |
| 3,029,385 | 4/1962 | Steinbrenner et al. | 73—67.2 X |
| 3,050,988 | 8/1962 | Gordon et al. | 73—67.5 |
| 3,065,631 | 11/1962 | Nerwin et al. | 73—67.8 |

FOREIGN PATENTS

| | | |
|---|---|---|
| 665,775 | 8/1951 | Great Britain. |
| 708,413 | 5/1954 | Great Britain. |
| 779,690 | 7/1957 | Great Britain. |

RICHARD C. QUEISSER, *Primary Examiner.*

JOHN P. BEAUCHAMP, J. J. GILL,
*Assistant Examiners.*